United States Patent Office 3,240,564
Patented Mar. 15, 1966

3,240,564
MANUFACTURE OF CARBON DISULFIDE
Rolf Uffelmann, Oberhochstadt, Taunus, Germany, assignor to E. Merck Aktiengesellschaft, Darmstadt, Germany, a corporation of Germany
No Drawing. Filed Feb. 6, 1964, Ser. No. 343,138
Claims priority, application Germany, Feb. 13, 1963,
U 9,573
2 Claims. (Cl. 23—206)

This invention relates to the manufacture of carbon disulfide; and more particularly, is directed to a novel process for the production of carbon disulfide.

It is known that carbon disulfide can be prepared from gaseous sulfur and carbon, especially charcoal, by the reaction of those substances at a temperature of about 1000° C. The carbon disulfide is obtained in gaseous form; is condensed; and rectified. That process has become uneconomical because of the use of charcoal.

According to another known process, carbon disulfide is prepared from light hydrocarbons and sulfur. Hydrogen sulfide is obtained simultaneously with the carbon disulfide. The hydrogen sulfide is separated and reoxidized to sulfur which is used again for reaction with the hydrocarbons. In this process a catalyst and temperatures of about 700° C. are necessary. Furthermore, voluminous additional equipment is required for the separation and the oxidation of the hydrogen sulfide which entails higher costs.

It has now been found that it is possible to avoid the aforementioned disadvantages by a novel process which comprises reacting sulfur and chlorinated hydrocarbons at a temperature of about 600 to 1200° C., the molar ratio of chlorine to hydrogen being 1:1 and that of carbon to sulfur being 1:2; thereby forming carbon disulfide and hydrogen chloride, which are separated in a known manner.

Accordingly, it is one of the principal objects of this invention to provide a novel process for the manufacture of carbon disulfide by the interaction of sulfur and chlorinated hydrocarbons; and thus to effectuate substantial economies. Chlorinated hydrocarbons which are useful in carrying out this novel process are preferably those isomers of hexachlorocyclohexane which are obtained as undesired by-products in the preparation of the γ-isomer which is a well known insecticide manufactured on a large scale.

In carrying out the reaction by this new process, carbon black is formed in the initial stages of the reaction until the inner walls of the apparatus are completely covered therewith.

The reaction may be represented by the following equation:

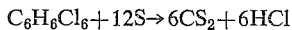

$$C_6H_6Cl_6 + 12S \rightarrow 6CS_2 + 6HCl$$

Formation of hydrogen sulfide can be avoided if dry starting materials are used. This is one of the great advantages of the instant novel process.

The reaction is exothermic; and the heat evolved is 74 kilocalories/mol, calculated for the starting materials at room temperature.

Essential features of the new process are: the molar ratios of chlorine-to-hydrogen, and of carbon-to-sulfur in the proportioning of the starting materials.

The chlorine and hydrogen should be present in equimolar proportions so that only carbon disulfide and hydrogen chloride are formed in order to suppress formation of hydrogen sulfide and chlorine or undesired chlorinated by-products. If the starting material contains hydrogen in excess of the above mentioned molar proportions, this excess may, for example, be compensated by addition of gaseous chlorine, sulfur chloride or higher chlorinated hydrocarbons. In the event that the chlorine is present in the starting materials in excess of the stoichiometric amount set forth in the foregoing equation, the deficiency in hydrogen may be compensated by the addition of hydrocarbons.

One of the characteristic features of the instant invention is that a complete interaction between the components may be achieved if the chlorinated hydrocarbon (which may be molten if desired) is reacted with the heated gaseous sulfur in finely divided form.

Heretofore known processes involving an interaction between hexachlorocyclohexane and sulfur were carried out at temperatures below 350° C. and with molar proportions other than those in accordance with the instant invention with resultant formation of polychlorobenzenes.

It is a striking advantage of the instant novel process that the hitherto useless isomers which are obtained, for example, in the manufacture of the insecticide γ-hexachlorocyclohexane can be used in an economical process for the manufacture of valuable products. Those useless isomers are found in large amounts as troublesome and hygienically critical tailings. By converting them into carbon disulfide and hydrogen chloride, two products are obtained for which there is great need; and which can be marketed everywhere. The dry hydrogen chloride obtained in accordance with this invention may be used as such, or as hydrochloric acid, or may also be converted into chlorine, which conversion requires less energy than the usual electrolysis of solutions of alkaline metal chlorides.

The following is an example in accordance with this invention:

*Example*

300 grams of hexachlorocyclohexane are intimately mixed with 400 grams of powdered sulfur. The mixture is poured through a pipe to the bottom of a vertical ceramic tube which is charged with inert filling materials such as glass or ceramics and which is heated up to about 850° C.

First of all, carbon black is formed. Later on, gaseous carbon disulfide and hydrogen chloride are produced which are cooled and condensed.

The reaction products are separated in a known manner, as for example, by adiabatic absorption of the hydrogen chloride with water whereby the carbon disulfide escapes, is condensed, and then rectified.

The bottom of the reaction tube may be heated up to 1200° C.

The used pipe is of sillimanite and has a length of 800 mm. and an inner diameter of 8 mm. The ceramic tube consists likewise of sillimanite and has a length of 700 mm. and an inner diameter of 36 mm. Preferably the apparatus is heated by an electric furnace.

It will be understood that the foregoing description of the invention and the example set forth is merely illustrative of the principles thereof. Accordingly, the appended claims are to be construed as defining the invention within the full spirit and scope thereof.

I claim:
1. Method of manufacturing carbon disulfide which comprises reacting hexachlorocyclohexane with sulfur at a temperature of about 600 to 1200° C., the molar proportions of chlorine-to-hydrogen being about 1:1 and that of carbon-to-sulfur being about 1:2, and separating the obtained carbon disulfide and hydrogen chloride.
2. Method in accordance with claim 1, wherein the hexachlorocyclohexane constitutes undesired isomeric by-products obtained in the manufacture of γ-hexachlorocyclohexane.

No references cited.

MAURICE A. BRINDISI, *Primary Examiner.*